United States Patent
Ikeda et al.

(10) Patent No.: US 12,523,377 B2
(45) Date of Patent: Jan. 13, 2026

(54) GAS TURBINE CONTROL DEVICE, GAS TURBINE CONTROL METHOD, AND STORAGE MEDIUM

(71) Applicant: MITSUBISHI HEAVY INDUSTRIES, LTD, Tokyo (JP)

(72) Inventors: Rei Ikeda, Tokyo (JP); Masahiko Nakahara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/746,729

(22) Filed: Jun. 18, 2024

(65) Prior Publication Data
US 2025/0027650 A1     Jan. 23, 2025

(30) Foreign Application Priority Data

Jul. 20, 2023    (JP) ................................ 2023-118457

(51) Int. Cl.
*F23R 3/36*        (2006.01)
*F02C 7/22*        (2006.01)
*F02C 9/40*        (2006.01)

(52) U.S. Cl.
CPC .................. *F23R 3/36* (2013.01); *F02C 7/22* (2013.01); *F02C 9/40* (2013.01); *F23R 2900/00004* (2013.01)

(58) Field of Classification Search
CPC .... F23R 3/34; F23R 3/346; F23R 3/36; F23R 2900/00004; F02C 7/22; F02C 7/228; F02C 9/34; F02C 9/40; F23D 2209/30; F23D 17/002; F23D 2900/00008; F23D 2900/00016; F23D 2204/10
See application file for complete search history.

(56) References Cited

U.S. PATENT DOCUMENTS

| | | | | |
|---|---|---|---|---|
| 8,694,170 B2 * | 4/2014 | Sonoda | ..................... | F02C 9/38 60/39.27 |
| 2011/0185698 A1 * | 8/2011 | Morgan | .................... | F02C 9/28 60/39.24 |
| 2012/0137699 A1 * | 6/2012 | Montagne | ................. | F02C 9/40 60/779 |

(Continued)

FOREIGN PATENT DOCUMENTS

JP        2002-250517        9/2002

*Primary Examiner* — Devon C Kramer
*Assistant Examiner* — Jingchen Liu
(74) *Attorney, Agent, or Firm* — Wenderoth, Lind & Ponack, L.L.P.

(57) ABSTRACT

A gas turbine includes a purge gas supply system for supplying a purge gas to a fuel oil injection nozzle for injecting a fuel oil to a combustion chamber. A gas turbine control device is configured to set a supply pressure target value of the purge gas, based on an operating state of the gas turbine, and control a purge gas supply pressure adjustment device so that a supply pressure of the purge gas becomes the supply pressure target value. The gas turbine control device is further configured to limit an increase rate of the supply pressure target value to be less than or equal to an increase rate upper limit, and correct the increase rate upper limit so that the increase rate upper limit is raised if correction of the increase rate upper limit is determined to be necessary based on the operating state of the gas turbine.

10 Claims, 6 Drawing Sheets

(56) References Cited

U.S. PATENT DOCUMENTS

| | | | | |
|---|---|---|---|---|
| 2016/0076461 A1* | 3/2016 | Kawai | ................... | B64D 37/30 |
| | | | | 60/39.463 |
| 2017/0138268 A1* | 5/2017 | Nakahara | ................ | F23D 17/00 |
| 2020/0362763 A1* | 11/2020 | Jarvo | ...................... | F02C 7/232 |
| 2021/0277796 A1* | 9/2021 | McCambridge | .......... | F02C 9/26 |
| 2021/0355883 A1* | 11/2021 | Yeung | .................... | F02C 7/222 |

* cited by examiner

GAS TURBINE CONTROL DEVICE, GAS TURBINE CONTROL METHOD, AND STORAGE MEDIUM

CROSS-REFERENCE TO RELATED APPLICATION

The present application claims priority based on Japanese Patent Application No. 2023-118457 filed on Jul. 20, 2023, the entire content of which is incorporated herein by reference.

TECHNICAL FIELD

The present disclosure relates to a gas turbine control device, a gas turbine control method, and a gas turbine control program.

BACKGROUND ART

For example, in thermal power plants, gas turbines are used as a power source for driving generators. Gas turbines are equipped with a combustor capable of generating combustion gas by combustion of fuel. The generated combustion gas is used to rotate a turbine, which in turn drives a generator connected to the turbine to generate electric power. As one of this type of gas turbine, the so-called dual-fired gas turbine, which can switch between fuel gas and fuel oil as fuel supplied to the combustor, is known (for example, JP 2002-250517 A).

SUMMARY

A dual-fired gas turbine, such as the one in JP 2002-250517 A, is provided with a fuel injection nozzle for injecting fuel gas into the combustion chamber and a fuel injection nozzle for injecting fuel oil into the combustion chamber. Here, when the gas turbine is operated using fuel gas as fuel, if fuel oil remains in the fuel injection nozzle for fuel oil in the stopped state, the remaining fuel oil may undergo coking by heating, resulting in clogging. To solve this problem, a purge gas supply system is also provided to supply purge gas to the fuel oil supply system to discharge the remaining fuel oil.

The pressure of purge gas used to discharge the fuel oil must be set higher than pressure in the casing to which the purge gas is supplied. As the purge gas, for example, compressed air is used, but when its temperature falls below 100° C., condensate may be generated. Such condensate deposits increase the pressure drop in the purge gas supply path and hinder the supply of purge gas. As a result, there is a risk of insufficient supply of purge gas to the fuel injection nozzle, resulting in nozzle coking caused by fuel oil remaining in the fuel injection nozzle.

In addition, the casing pressure of the gas turbine is variable according to the operating state (e.g., load) of the gas turbine. Therefore, the purge gas pressure setting value should also be variable according to the casing pressure so that purge gas can be supplied appropriately even when the casing pressure changes. However, if the casing pressure drops, a large amount of purge gas is temporarily supplied, which may cause the gas turbine to misfire, so a predetermined increase rate upper limit is set for the purge gas pressure setting value.

However, in a transient state where the casing pressure changes significantly due to a sudden change in the required output to the gas turbine, the casing pressure and the purge gas pressure setting lack balance due to the piping length and valve operation delay in the purge gas supply system, making it difficult to supply purge gas as normal. For example, if the casing pressure increases rapidly, the purge gas pressure setting value becomes temporarily small in relation to the casing pressure, leading to insufficient supply of purge gas.

At least one embodiment of the present disclosure was made in view of the above circumstances, and an object thereof is to provide a gas turbine control device, a gas turbine control method, and a storage medium whereby it is possible to prevent nozzle coking by suitably supplying purge gas to the fuel oil supply system, regardless of the operating state of the gas turbine.

In order to solve the above-described problems, a gas turbine control device according to at least one embodiment of the present disclosure for controlling a gas turbine that includes: a combustor having a fuel oil injection nozzle for injecting fuel oil into a combustion chamber; a fuel oil supply system for supplying the fuel oil to the fuel oil injection nozzle; a purge gas supply system for supplying purge gas to the fuel oil injection nozzle; and a purge gas supply pressure adjustment part for adjusting supply pressure of the purge gas includes: an operating state acquisition part for acquiring an operating state of the gas turbine; a supply pressure target value setting part for setting a supply pressure target value of the purge gas, based on the operating state; an increase rate limiting part for obtaining a limited supply pressure target value by limiting an increase rate of the supply pressure target value to be less than or equal to an increase rate upper limit; a determination part for determining whether correction of the increase rate upper limit is necessary, based on the operating state; an increase rate upper limit correction part for correcting the increase rate upper limit so that the increase rate upper limit is increased if it is determined by the determination part that the correction is necessary; and a control part for controlling the purge gas supply pressure adjustment part so that the supply pressure of the purge gas becomes the limited supply pressure target value.

In order to solve the above-described problems, a gas turbine control method according to at least one embodiment of the present disclosure for controlling a gas turbine that includes: a combustor having a fuel oil injection nozzle for injecting fuel oil into a combustion chamber; a fuel oil supply system for supplying the fuel oil to the fuel oil injection nozzle; a purge gas supply system for supplying purge gas to the fuel oil injection nozzle; and a purge gas supply pressure adjustment part for adjusting supply pressure of the purge gas includes: a step of acquiring an operating state of the gas turbine; a step of setting a supply pressure target value of the purge gas, based on the operating state; a step of obtaining a limited supply pressure target value by limiting an increase rate of the supply pressure target value to be less than or equal to an increase rate upper limit; a step of determining whether correction of the increase rate upper limit is necessary, based on the operating state; a step of correcting the increase rate upper limit so that the increase rate upper limit is increased if it is determined that the correction is necessary; and a step of controlling the purge gas supply pressure adjustment part so that the supply pressure of the purge gas becomes the limited supply pressure target value.

In order to solve the above-described problems, a computer-readable storage medium stores a gas turbine control program according to at least one embodiment of the present disclosure for controlling a gas turbine that includes: a combustor having a fuel oil injection nozzle for injecting fuel oil into a combustion chamber; a fuel oil supply system for supplying the fuel oil to the fuel oil injection nozzle; a purge gas supply system for supplying purge gas to the fuel oil injection nozzle; and a purge gas supply pressure adjustment part for adjusting supply pressure of the purge gas. The gas turbine control program is capable of causing a computer device to execute: a step of acquiring an operating state of the gas turbine; a step of setting a supply pressure target value of the purge gas, based on the operating state; a step of obtaining a limited supply pressure target value by limiting an increase rate of the supply pressure target value to be less than or equal to an increase rate upper limit; a step of determining whether correction of the increase rate upper limit is necessary, based on the operating state; a step of correcting the increase rate upper limit so that the increase rate upper limit is increased if it is determined that the correction is necessary; and a step of controlling the purge gas supply pressure adjustment part so that the supply pressure of the purge gas becomes the limited supply pressure target value.

At least one embodiment of the present disclosure provides a gas turbine control device, a gas turbine control method, and a storage medium whereby it is possible to prevent nozzle coking by suitably supplying purge gas to the fuel oil supply system, regardless of the operating state of the gas turbine.

DETAILED DESCRIPTION

Figure 1:
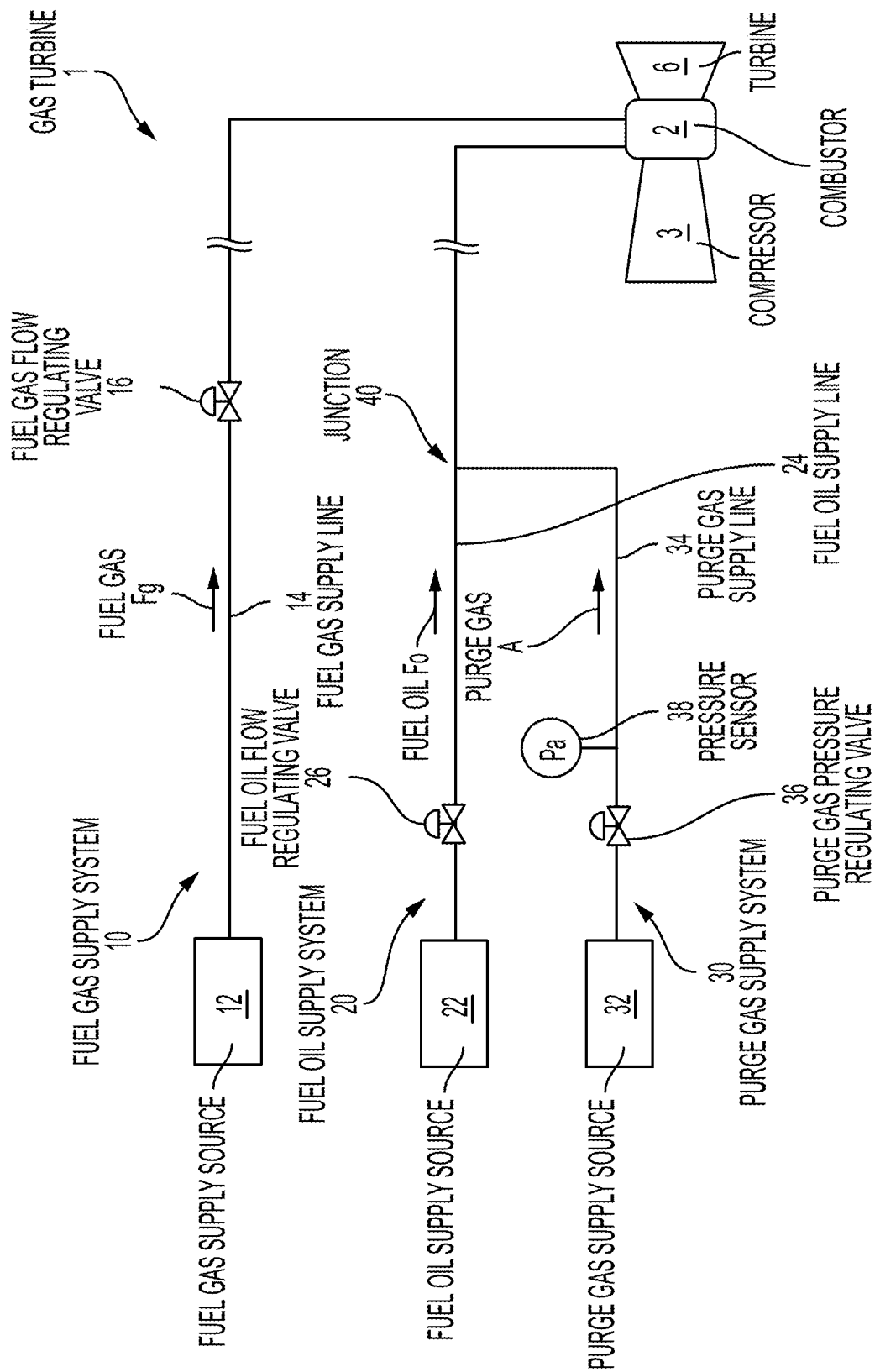
FIG. 1 is a schematic configuration diagram of a gas turbine according to an embodiment.

Embodiments of the present invention will now be described in detail with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a schematic configuration diagram of a gas turbine 1 according to an embodiment. The gas turbine 1 includes a compressor 3 for generating compressed air, a combustor 2 for generating combustion gas by burning a mixture of the compressed air generated by the compressor 3 and fuel, and a turbine 6 driven by the combustion gas. The combustor 2 is supplied with fuel from a fuel supply system described below along with the compressed air compressed by the compressor 3, where they are mixed and burned to generate combustion gas. The combustion gas flows into the turbine 6 and functions as power to drive the turbine 6.

The gas turbine 1 is a dual-fired gas turbine that can switch fuel between fuel gas Fg and fuel oil Fo. The gas turbine 1 includes a fuel gas supply system 10 and a fuel oil supply system 20 as fuel supply systems for supplying these fuels respectively to the combustor 2.

The combustor 2 has a plurality of fuel injection nozzles for injecting fuel into the combustion chamber to generate combustion gas. When multiple types of fuels are handled in a gas turbine, these fuel injection nozzles include a corresponding fuel injection nozzle for each type of fuel. In this embodiment, the fuel gas supply system 10 is connected to a fuel gas injection nozzle, which is the fuel injection nozzle corresponding to fuel gas, and the fuel oil supply system 20 is connected to a fuel oil injection nozzle, which is the fuel injection nozzle corresponding to fuel oil.

The fuel gas supply system 10 is configured to supply fuel gas Fg as fuel to the fuel gas injection nozzle of the combustor 2. The fuel gas supply system 10 includes a fuel gas supply line 14 connecting a fuel gas supply source 12 to the fuel gas injection nozzle. The fuel gas supply line 14 is provided with a fuel gas flow regulating valve 16 for regulating the flow rate of fuel gas Fg supplied to the fuel gas injection nozzle. The opening degree of the fuel gas flow regulating valve 16 can be controlled based on a control signal from a gas turbine control device 100 (see FIG. 2) which is the controller.

The fuel oil supply system 20 is configured to supply fuel oil Fo as fuel to the fuel oil injection nozzle of the combustor 2. The fuel oil supply system 20 includes a fuel oil supply line 24 connecting a fuel oil supply source 22 to the fuel oil injection nozzle. The fuel oil supply line 24 is provided with a fuel oil flow regulating valve 26 for regulating the flow rate of fuel oil Fo supplied to the fuel oil injection nozzle. The opening degree of the fuel oil flow regulating valve 26 can be controlled based on a control signal from the gas turbine control device 100 (see FIG. 2) which is the controller.

A purge gas supply system 30 is configured to supply purge gas A to the fuel oil injection nozzle of the combustor 2. When the gas turbine 1 is stopped or operated with fuel gas Fg, the supply of fuel oil Fo through the fuel oil supply system 20 is stopped. In this case, if fuel oil Fo remains in the fuel oil injection nozzle of the combustor 2 to which the fuel oil supply system 20 is connected, the fuel oil Fo may be heated by heat generated during operation of the gas turbine 1, which may cause coking in the fuel oil injection nozzle, resulting in clogging. Therefore, in the gas turbine 1, when the fuel oil supply system 20 is stopped, purge gas A is supplied to the fuel oil injection nozzle of the combustor 2 from the purge gas supply system 30 to discharge fuel oil Fo remaining in the fuel oil injection nozzle and prevent coking.

The purge gas supply system 30 includes a purge gas supply line 34 connected to a purge gas supply source 32. The purge gas supply line 34 joins the fuel oil supply line 24 at a junction 40 and is connected to the fuel oil injection nozzle. The purge gas supply line 34 is provided with a purge gas pressure regulating valve 36 as an example of a purge gas supply pressure adjustment part for adjusting the pressure of purge gas A. Downstream of the purge gas pressure regulating valve 36 in the purge gas supply line 34, a pressure sensor 38 is installed to detect pressure Pa of purge gas A. The pressure Pa of purge gas A detected by the pressure sensor 38 is sent as an electrical signal to the controller, gas turbine control device 100 (see FIG. 2), and the opening degree of the purge gas pressure regulating valve 36 can be controlled based on a control signal obtained by arithmetic processing of the gas turbine control device 100.

Next, the gas turbine control device 100 for controlling the gas turbine 1 having the above configuration will be described. The gas turbine control device 100 includes, for example, a Central Processing Unit (CPU), a Random Access Memory (RAM), a Read Only Memory (ROM), a computer-readable storage medium, and the like. Then, a series of processes for realizing various functions is stored in the storage medium or the like in the form of a program, as an example. The CPU reads the program out to the RAM or the like and executes processing/calculation of information, thereby realizing the various functions. The program may be installed in the ROM or another storage medium in advance, or may be stored in the computer-readable storage medium and provided, or may be distributed through wired or wireless communication means, for example. The computer-readable storage medium may be a magnetic disk, a magneto-optical disk, a CD-ROM, a DVD-ROM, or a semiconductor memory.

Figure 2:
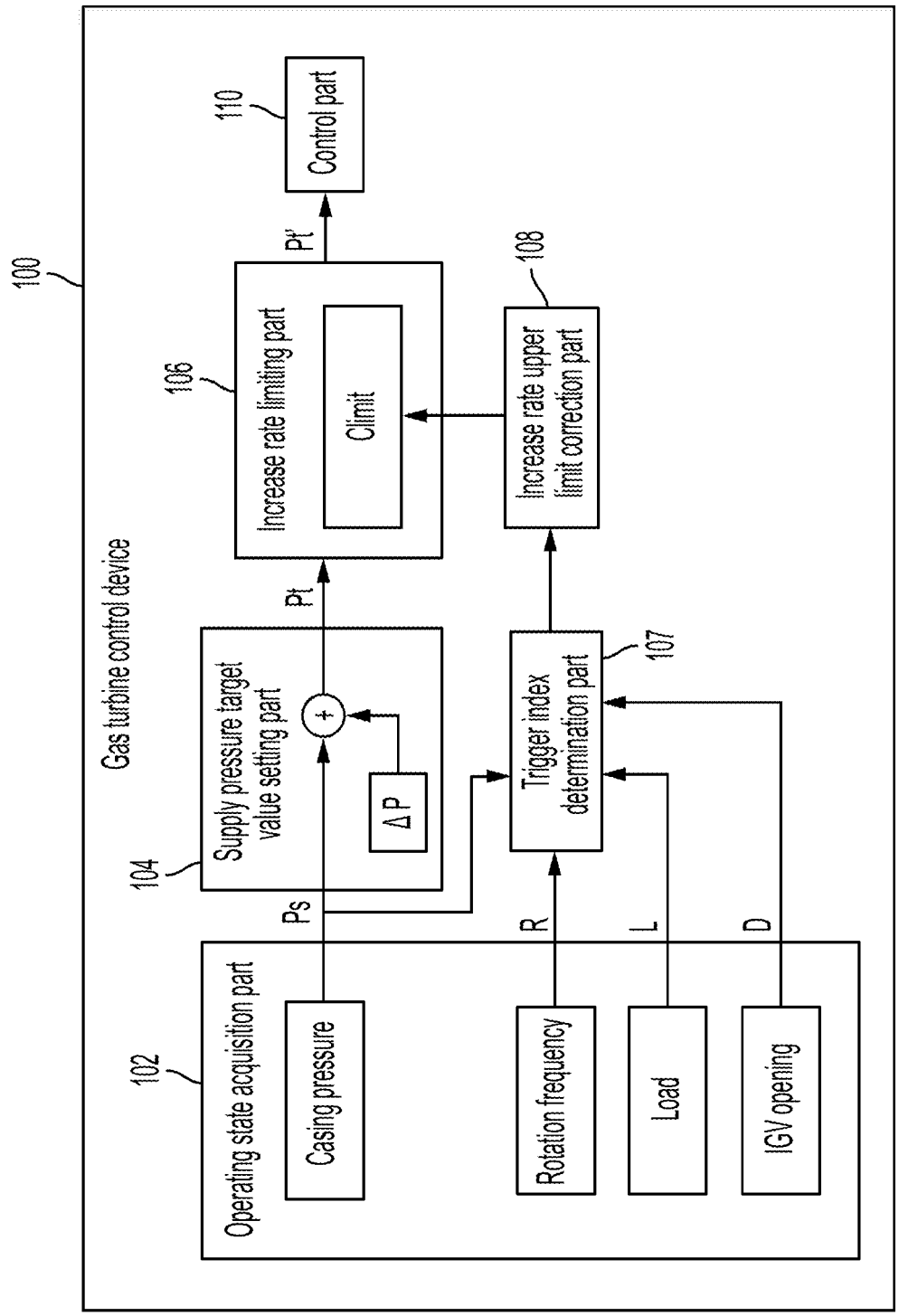
FIG. 2 is a block configuration diagram of a gas turbine control device for controlling the gas turbine of FIG. 1.

FIG. 2 is a block configuration diagram of the gas turbine control device 100 for controlling the gas turbine 1 of FIG. 1. The gas turbine control device 100 includes an operating state acquisition part 102, a supply pressure target value setting part 104, an increase rate limiting part 106, a trigger index determination part 107, an increase rate upper limit correction part 108, and a control part 110.

The operating state acquisition part 102 is configured to acquire the operating state of the gas turbine 1. The operating state acquired by the operating state acquisition part 102 includes parameters necessary for various calculations performed by the gas turbine control device 100, which in this embodiment includes at least casing pressure Ps of the gas turbine 1, rotation frequency R, load L, and opening degree D of inlet guide vane (IGV). Each parameter acquired as the operating state may be values detected by sensors installed at appropriate locations in the gas turbine 1, or may be estimated values obtained arithmetically.

The supply pressure target value setting part 104 is configured to set supply pressure target value Pt of purge gas A, based on the operating state of the gas turbine 1. The supply pressure target value Pt is a control target value regarding supply pressure Pa of purge gas A. In this embodiment, supply pressure target value Pt is set based on casing pressure Ps acquired as the operating state of the gas turbine 1. More specifically, the supply pressure target value setting part 104 sets supply pressure target value Pt by adding a predetermined differential pressure ΔP that is set in advance to casing pressure Ps, as shown in the following expression:

$$Pt = Ps + \Delta P \quad (1)$$

The increase rate limiting part 106 is configured to limit the increase rate C of supply pressure target value Pt to be less than or equal to the increase rate upper limit Climit. As described above, since supply pressure target value Pt is set based on the operating state of the gas turbine 1, supply pressure target value Pt changes with a change in the operating state of the gas turbine 1. The increase rate limiting part 106 limits the increase rate C of supply pressure target value Pt to be equal to the increase rate upper limit Climit when the increase rate C exceeds the increase rate upper limit Climit (hereinafter, supply pressure target value output from the increase rate limiting part 106 is referred to as "limited supply pressure target value Pt'," as appropriate).

When the increase rate C of supply pressure target value Pt is less than or equal to the increase rate upper limit Climit, the increase rate C is not limited, and the limited supply pressure target value Pt' is equal to supply pressure target value Pt input to the increase rate limiting part 106.

The increase rate upper limit Climit is set in advance. For example, it is set to a value suitable for suppressing misfire caused by supplying a large amount of purge gas A to the combustor 2 when casing pressure Ps suddenly changes.

The trigger index determination part 107 is configured to determine, based on a trigger index, whether the increase rate upper limit Climit needs to be corrected by the increase rate upper limit correction part 108. In this embodiment, at least one of casing pressure Ps, rotation frequency R, load L, and IGV opening degree D is used as the trigger index.

More specifically, in the case of using casing pressure Ps as the trigger index, the trigger index determination part 107 determines that the increase rate upper limit Climit needs to be corrected when casing pressure Ps increases rapidly (when the increase rate of casing pressure Ps is more than or equal to a reference value). In the case of using rotation frequency R as the trigger index, the trigger index determination part 107 determines that the increase rate upper limit Climit needs to be corrected when rotation frequency R decreases rapidly (when the decrease rate of rotation frequency R is more than or equal to a reference value). In the case of using load L as the trigger index, the trigger index determination part 107 determines that the increase rate upper limit Climit needs to be corrected when load L increases rapidly (when the increase rate of load L is more than or equal to a reference value). In the case of using IGV opening degree D as the trigger index, the trigger index determination part 107 determines that the increase rate upper limit Climit needs to be corrected when IGV opening degree D increases rapidly (when the increase rate is more than or equal to a reference value).

The increase rate upper limit correction part 108 is configured to correct, based on a determination result of the trigger index determination part 107, the increase rate upper limit Climit in the increase rate limiting part 106. If the trigger index determination part 107 determines that the increase rate upper limit Climit needs to be corrected based on any of the trigger indexes as described above, the increase rate upper limit correction part 108 corrects the increase rate upper limit Climit. This correction is performed so that the increase rate upper limit Climit is increased when casing pressure Ps of the gas turbine 1 is greater than limited supply pressure target value Pt'.

The control part 110 is configured to adjust the supply pressure of purge gas A to be equal to the limited supply pressure target value Pt' by controlling the opening degree of the purge gas pressure regulating valve 36, which is the purge gas supply pressure adjustment part. This control may be implemented, for example, as a feedback control so that the difference between the supply pressure of purge gas A and the limited supply pressure target value Pt' becomes smaller.

Figure 3:
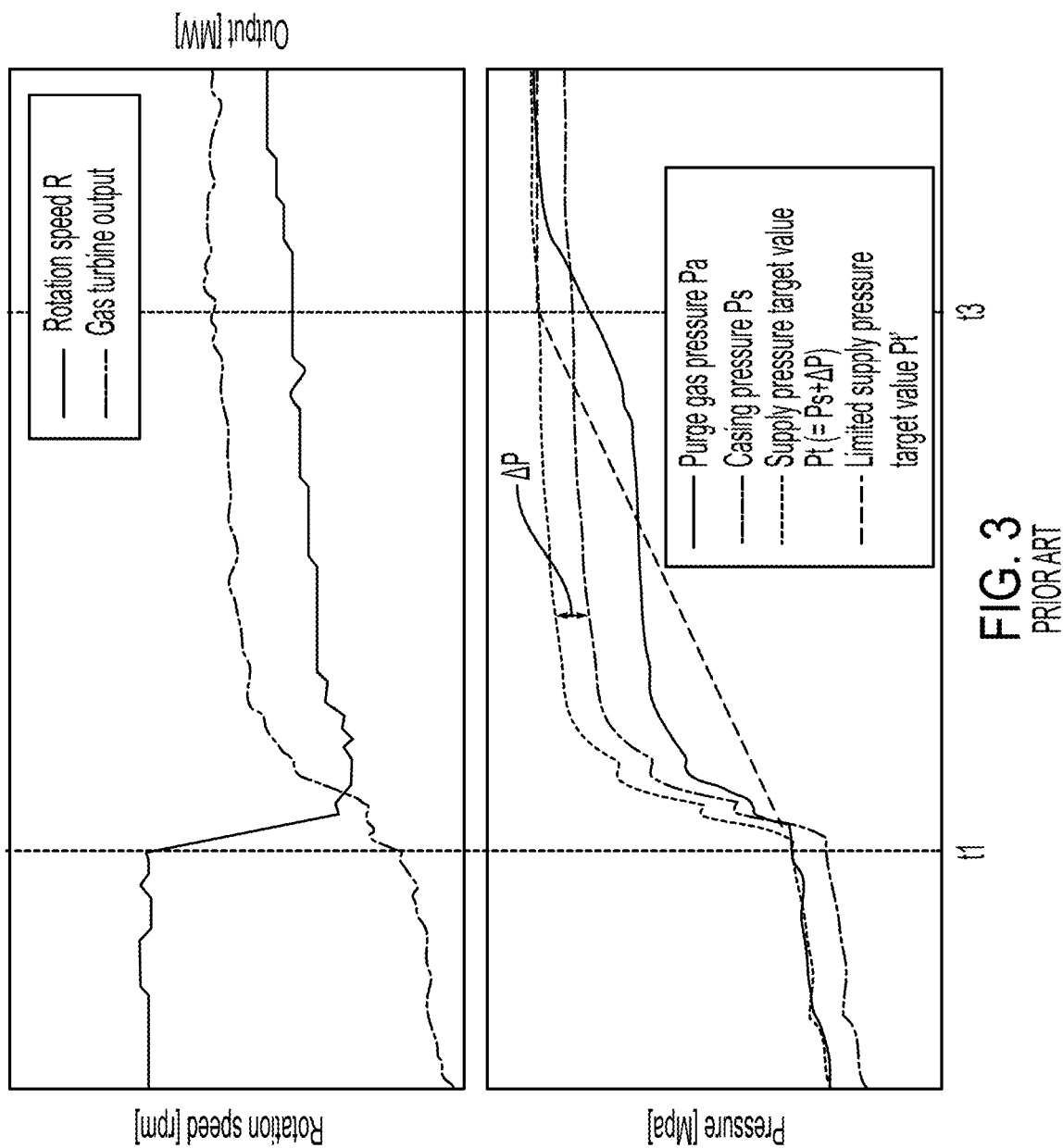
FIG. 3 is a diagram showing the time variation of each parameter of the gas turbine when correction control by the increase rate upper limit correction part in FIG. 2 is not performed.

Correction control of the increase rate upper limit Climit by the increase rate upper limit correction part 108 will now be described specifically. FIG. 3 is a diagram showing the time variation of each parameter of the gas turbine 1 when correction control by the increase rate upper limit correction part 108 in FIG. 2 is not performed. In this example, the operating state of the gas turbine 1 changes such that, at time t1, rotation speed R of the gas turbine 1 rapidly decreases and casing pressure Ps rapidly increases. At this time, supply pressure target value Pt also increases because supply pressure target value Pt is obtained by adding a predetermined differential pressure ΔP to casing pressure Ps, as shown in the above-described expression (1).

From time t1 to time t3, the increase rate C of supply pressure target value Pt exceeds the increase rate upper limit Climit, so the limited supply pressure target value Pt' shows linear behavior with a constant slope corresponding to the increase rate upper limit Climit. Here, during the period from time t1 to time t2 (<t3), casing pressure Ps is greater than limited supply pressure target value Pt'. This means that purge gas A cannot be supplied properly in the purge gas supply system 30 because the downstream pressure is higher than the upstream pressure. In this case, fuel oil Fo remaining in the fuel oil injection nozzle cannot be discharged due to insufficient supply of purge gas A to the fuel oil injection nozzle, which may cause coking.

Figure 4:
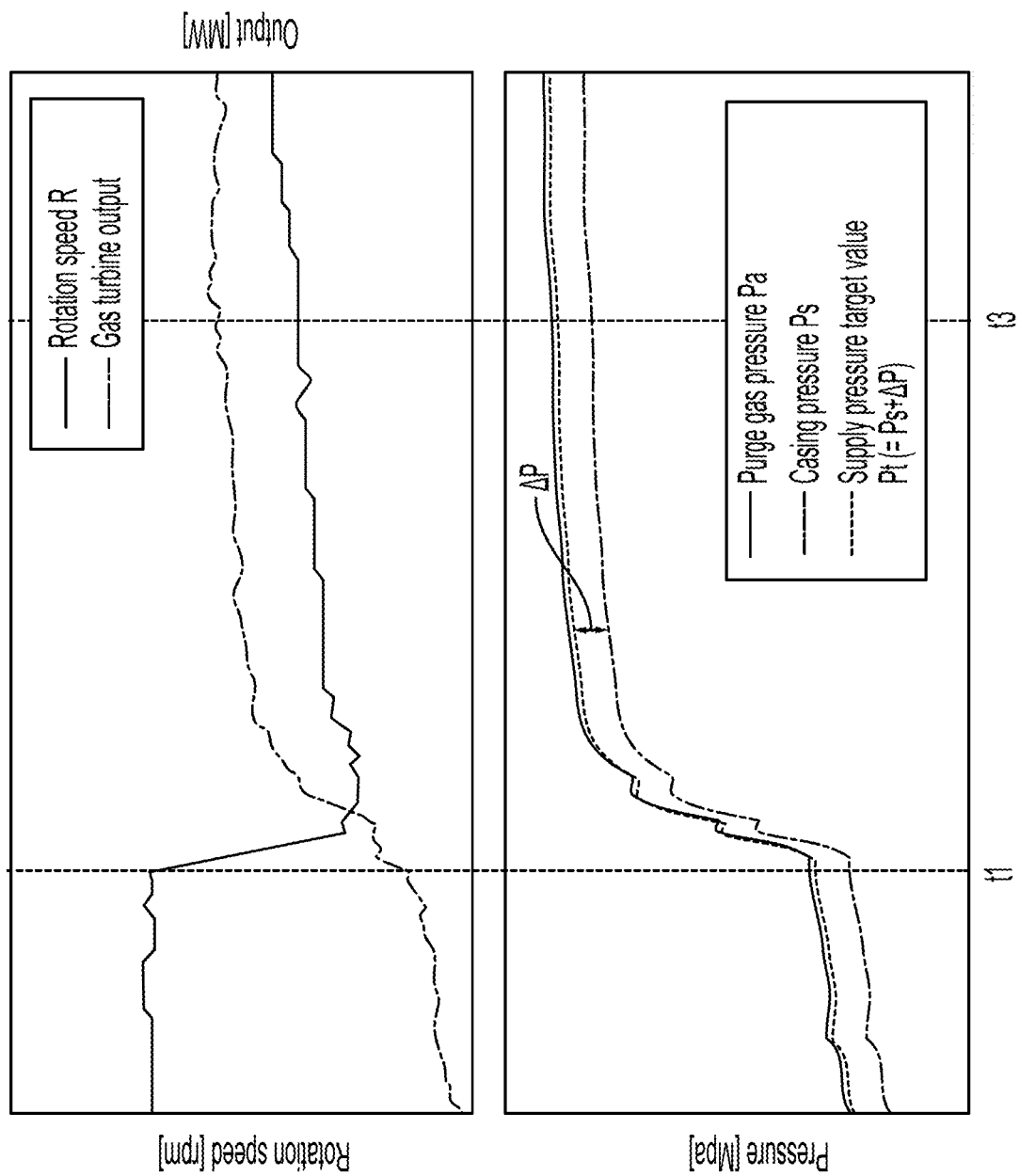
FIG. 4 is a diagram showing the time variation of each parameter of the gas turbine when correction control by the increase rate upper limit correction part in FIG. 2 is performed.

On the other hand, FIG. 4 is a diagram showing the time variation of each parameter of the gas turbine 1 when correction control by the increase rate upper limit correction part 108 in FIG. 2 is performed. In the gas turbine control device 100 according to this embodiment, as described above, around time t1, rotation frequency R rapidly decreases and casing pressure Ps rapidly increases, so the trigger index determination part 107 determines that the increase rate upper limit Climit needs to be corrected. As a result, the increase rate upper limit correction part 108 corrects the increase rate upper limit Climit so that the increase rate upper limit Climit is increased during the period (between time t1 and time t3) where casing pressure Ps of the gas turbine 1 is greater than limited supply pressure target value Pt' in FIG. 3.

In FIG. 4, the increase rate upper limit Climit is corrected to an infinitely large value (i.e., upper limit is eliminated) during the period from time t1 to time t3, so that casing pressure Ps of the gas turbine 1 is roughly equal to supply pressure target value Pt (or limited supply pressure target value Pt'), and the period during which casing pressure Ps of the gas turbine 1 is greater than supply pressure target value Pt (or limited supply pressure target value Pt') is no longer present (or is significantly less) than in FIG. 3. This indicates that the inability to properly supply purge gas A to the fuel oil injection nozzle due to casing pressure Ps being greater than limited supply pressure target value Pt' is improved.

Figure 5A:
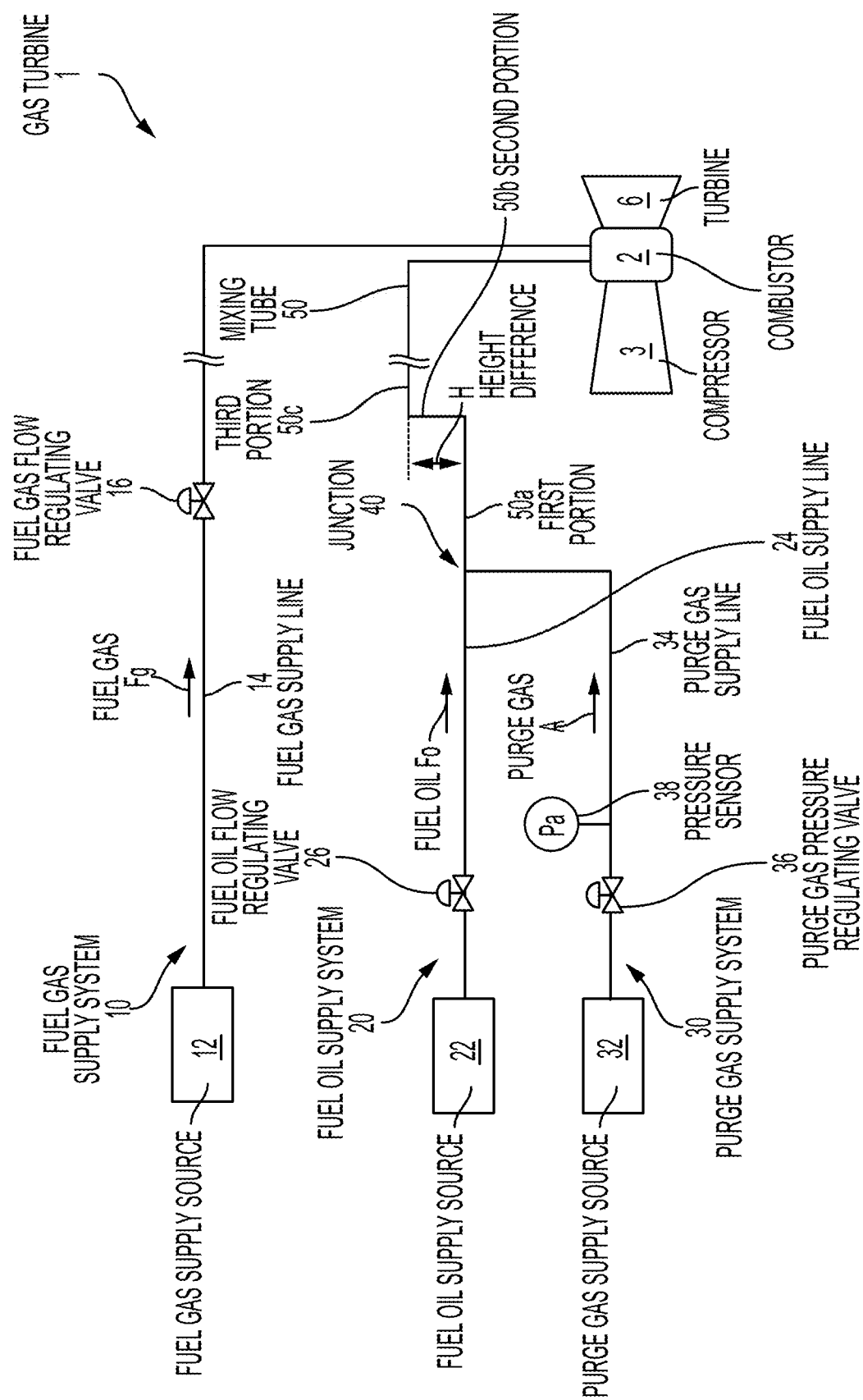
FIG. 5A is a schematic configuration diagram of the gas turbine according to another embodiment.

Next, the configuration of the gas turbine 1 according to another embodiment will be described. FIG. 5A is a schematic configuration diagram of the gas turbine 1 according to another embodiment.

In the following description, configurations corresponding to those in the above-described embodiment are associated with the same reference numerals, and not described again unless otherwise required.

The gas turbine 1 according to this embodiment has a height difference H in a mixing tube 50 that connects the junction 40 and the combustor 2. The mixing tube 50 illustrated in FIG. 5A includes a first portion 50a, a second portion 50b, and a third portion 50c. The first portion 50a extends in a substantially horizontal direction, with one upstream end connected to the junction 40 and the other downstream end connected to the second portion 50b. The second portion 50b has a length corresponding to the height difference H by extending in a substantially vertical direction, with one upstream end connected to the first portion 50a and the other downstream end connected to the third portion 50c. The third portion 50c extends in a substantially horizontal direction, with one upstream end connected to the second portion 50b and the other downstream end connected to the combustor 2.

However, the shape of the mixing tube 50 is not limited to this embodiment.

As described above, for example, compressed air is used as purge gas A, but when its temperature falls below 100° C., condensate may be generated. If condensate deposits in the mixing tube 50 with the height difference H, the supply of purge gas A may be impeded, and nozzle coking may occur in the fuel injection nozzle of the combustor 2. To prevent such nozzle coking, the supply pressure of purge gas A is set to be greater than a reference pressure, which takes into account the volume of condensate deposited in the mixing tube 50 with the height difference H. Specifically, the opening degree of the purge gas pressure regulating valve 36 is controlled so that the pressure of purge gas A detected by the pressure sensor 38 is greater than the reference pressure. In other words, the reference pressure is set based on the height difference H for the proper flow of purge gas A against the deposited condensate. As a result, even if condensate deposits in the mixing tube 50 with the height difference H, purge gas A is suitably supplied to the fuel injection nozzle of the combustor 2 against the condensate to prevent nozzle coking.

Figure 5B:
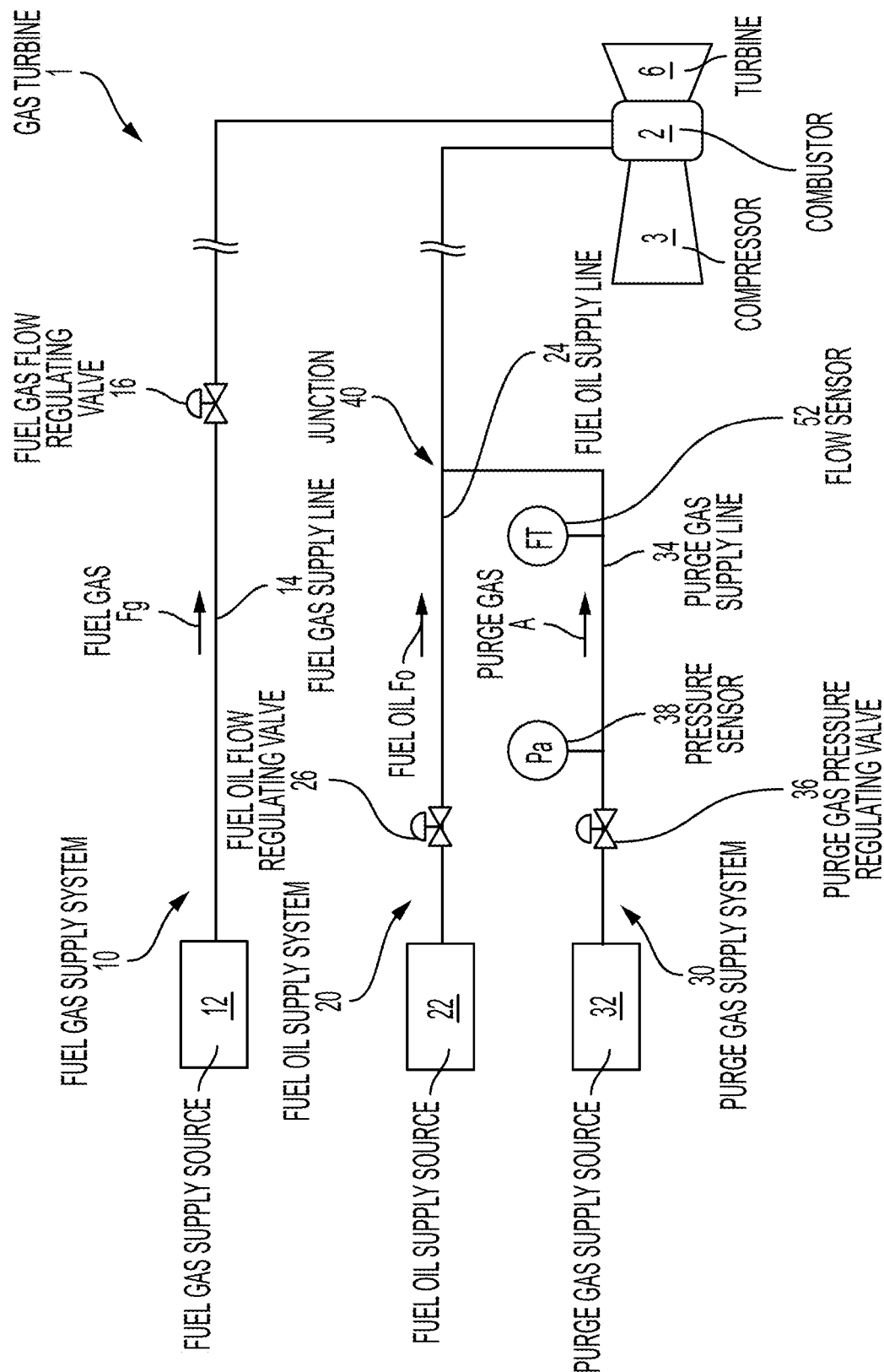
FIG. 5B is a schematic configuration diagram of the gas turbine according to another embodiment.

FIG. 5B is a schematic configuration diagram of the gas turbine 1 according to another embodiment.

In the following description, configurations corresponding to those in the above-described embodiment are associated with the same reference numerals, and not described again unless otherwise required.

The gas turbine 1 according to this embodiment is equipped with a flow sensor 52 on the purge gas supply line 34 for detecting the flow rate of purge gas A. The gas turbine control device 100 determines whether purge gas A is flowing properly by monitoring the flow rate of purge gas A detected by the flow sensor 52. This determination is made by comparing a value detected by the flow sensor 52 with a threshold used to determine that purge gas A is flowing normally.

If it is determined that purge gas A is not flowing properly, the gas turbine control device 100 may stop (trip) the operation of the gas turbine 1. If the gas turbine 1 continues to operate without purge gas A being supplied to the fuel injection nozzle, the possibility of nozzle coking increases. Therefore, by stopping the operation of the gas turbine 1 in this manner, the occurrence of nozzle coking can be prevented. Also, in the case where purge gas A cannot be supplied due to a large amount of deposited condensate, the operation of the gas turbine 1 may be stopped to prevent nozzle coking.

Further, if it is determined that purge gas A is not flowing properly, the gas turbine control device 100 may perform control to increase the supply pressure of purge gas A. For example, when the supply pressure of purge gas A is controlled by regulating the opening degree of the purge gas pressure regulating valve 36 so that the detected value of the pressure sensor 38 is equal to the reference pressure, the supply pressure of purge gas A can be increased by changing the reference pressure to increase. By increasing the supply pressure of purge gas A in this manner, purge gas A can overcome the deposited condensate, and purge gas A can be supplied to the fuel injection nozzle of the combustor 2 to prevent nozzle coking.

As described above, according to the aforementioned embodiments, when casing pressure Ps of the gas turbine 1 is greater than the purge gas supply pressure target value, the increase rate upper limit is corrected to be larger. This increases the supply pressure target value, which is limited by the increase rate upper limit, thereby shortening the period during which insufficient supply of purge gas is a concern as the casing pressure of the gas turbine is greater than the purge gas supply pressure target value. As a result, the supply of purge gas to the fuel oil injection nozzle is accelerated, and coking can be effectively suppressed.

In addition, the components in the above-described embodiments may be appropriately replaced with known components without departing from the spirit of the present disclosure, or the above-described embodiments may be appropriately combined.

The contents described in the above embodiments would be understood as follows, for instance.

(1) A gas turbine control device according to one aspect for controlling a gas turbine that includes: a combustor having a fuel oil injection nozzle for injecting fuel oil into a combustion chamber; a fuel oil supply system for supplying the fuel oil to the fuel oil injection nozzle; a purge gas supply system for supplying purge gas to the fuel oil injection nozzle; and a purge gas supply pressure adjustment part for adjusting supply pressure of the purge gas includes: an operating state acquisition part for acquiring an operating state of the gas turbine; a supply pressure target value setting part for setting a supply pressure target value of the purge gas, based on the operating state; an increase rate limiting part for obtaining a limited supply pressure target value by limiting an increase rate of the supply pressure target value to be less than or equal to an increase rate upper limit; a determination part for determining whether correction of the increase rate upper limit is necessary, based on the operating state; an increase rate upper limit correction part for correcting the increase rate upper limit so that the increase rate upper limit is increased if it is determined by the determination part that the correction is necessary; and a control part for controlling the purge gas supply pressure adjustment part so that the supply pressure of the purge gas becomes the limited supply pressure target value.

According to the above aspect (1), when it is determined, based on the operating state of the gas turbine, that there is a concern about insufficient supply of purge gas, for example, as the casing pressure of the gas turbine is greater than the purge gas supply pressure target value, the increase rate upper limit for limiting the increase rate of the supply pressure target value is corrected and increased. This shortens the period during which the casing pressure of the gas turbine is greater than the purge gas supply pressure target value due to the supply pressure target value being limited by the increase rate upper limit. As a result, the supply of purge gas to the fuel oil injection nozzle is accelerated, and coking can be effectively suppressed.

(2) In another aspect, in the above aspect (1), the determination part is configured to determine that the correction is necessary if an increase rate of casing pressure is more than or equal to a reference value.

If the increase rate of casing pressure of the gas turbine is more than or equal to the reference value, the casing pressure of the gas turbine becomes greater than the purge gas supply pressure target value due to a rapid increase in casing pressure, which may result in insufficient supply of purge gas. According to the above aspect (2), in such a case, the increase rate upper limit is corrected as described above, thereby effectively shortening the period during which insufficient supply of purge gas is a concern as the casing pressure of the gas turbine is greater than the purge gas supply pressure target value.

(3) In another aspect, in the above aspect (1) or (2), the determination part is configured to determine that the correction is necessary if a decrease rate of rotation speed of the gas turbine is more than or equal to a reference value.

If the decrease rate of rotation frequency of the gas turbine is more than or equal to the reference value, the casing pressure of the gas turbine becomes greater than the purge gas supply pressure target value due to a rapid decrease in rotation frequency, which may result in insufficient supply of purge gas. According to the above aspect (3), in such a case, the increase rate upper limit is corrected as described above, thereby effectively shortening the period during which insufficient supply of purge gas is a concern as the casing pressure of the gas turbine is greater than the purge gas supply pressure target value.

(4) In another aspect, in any of the above aspects (1) to (3), the determination part is configured to determine that the correction is necessary if an increase rate of load of the gas turbine is more than or equal to a reference value.

If the increase rate of load of the gas turbine is more than or equal to the reference value, the casing pressure of the gas turbine becomes greater than the purge gas supply pressure target value due to a rapid increase in load, which may result in insufficient supply of purge gas. According to the above aspect (4), in such a case, the increase rate upper limit is corrected as described above, thereby effectively shortening the period during which insufficient supply of purge gas is a concern as the casing pressure of the gas turbine is greater than the purge gas supply pressure target value.

(5) In another aspect, in any one of the above aspects (1) to (4), the determination part is configured to determine that the correction is necessary if an increase rate of opening degree of an inlet guide vane of the gas turbine is more than or equal to a reference value.

If the increase rate of opening degree of the inlet guide vane (IGV) of the gas turbine is more than or equal to the reference value, the casing pressure of the gas turbine becomes greater than the purge gas supply pressure target value due to a rapid increase in opening degree, which may result in insufficient supply of purge gas. According to the above aspect (5), in such a case, the increase rate upper limit is corrected as described above, thereby effectively shortening the period during which insufficient supply of purge gas is a concern as the casing pressure of the gas turbine is greater than the purge gas supply pressure target value.

(6) In another aspect, in any one of the above aspects (1) to (5), the supply pressure target value setting part is configured to set the supply pressure target value by adding a preset reference differential pressure to casing pressure of the gas turbine.

According to the above aspect (6), the supply pressure target value is set by adding the reference differential pressure to the casing pressure. This allows purge gas to be supplied accurately since the supply pressure target value is higher than the casing pressure, as long as the supply pressure target value is not limited by the increase rate upper limit.

(7) In another aspect, in any one of the above aspects (1) to (6), the increase rate upper limit correction part is configured to correct the increase rate upper limit so that the increase rate upper limit is eliminated when it is determined that the correction is necessary.

According to the above aspect (7), the increase rate upper limit is corrected so that the increase rate upper limit is eliminated. This increases the supply pressure target value, which is limited by the increase rate upper limit, thereby shortening the period during which insufficient supply of purge gas is a concern as the casing pressure of the gas turbine is greater than the purge gas supply pressure target value.

(8) In another aspect, in any one of the above aspects (1) to (7), the gas turbine further includes: a fuel gas injection nozzle for injecting fuel gas to the combustion chamber; and a fuel gas supply system for supplying the fuel gas to the fuel gas injection nozzle.

According to the above aspect (8), insufficient supply of purge gas can be effectively solved in so-called dual-fired gas turbines, which can use fuel gas as fuel in addition to fuel oil.

(9) In another aspect, in any one of the above aspects (1) to (8), the purge gas is compressed air.

According to the above aspect (9), insufficient supply of purge gas can be effectively solved in gas turbines that use compressed air as purge gas, which tends to generate condensate when the temperature falls below 100° C.

(10) A gas turbine control method according to one aspect for controlling a gas turbine that includes: a combustor having a fuel oil injection nozzle for injecting fuel oil into a combustion chamber; a fuel oil supply system for supplying the fuel oil to the fuel oil injection nozzle; a purge gas supply system for supplying purge gas to the fuel oil injection nozzle; and a purge gas supply pressure adjustment part for adjusting supply pressure of the purge gas includes: a step of acquiring an operating state of the gas turbine; a step of setting a supply pressure target value of the purge gas, based on the operating state; a step of obtaining a limited supply pressure target value by limiting an increase rate of the supply pressure target value to be less than or equal to an increase rate upper limit; a step of determining whether correction of the increase rate upper limit is necessary, based on the operating state; a step of correcting the increase rate upper limit so that the increase rate upper limit is increased if it is determined that the correction is necessary; and a step of controlling the purge gas supply pressure adjustment part so that the supply pressure of the purge gas becomes the limited supply pressure target value.

According to the above aspect (10), when it is determined, based on the operating state of the gas turbine, that there is a concern about insufficient supply of purge gas, for example, as the casing pressure of the gas turbine is greater than the purge gas supply pressure target value, the increase rate upper limit for limiting the increase rate of the supply pressure target value is corrected and increased. This shortens the period during which the casing pressure of the gas turbine is greater than the purge gas supply pressure target value due to the supply pressure target value being limited by the increase rate upper limit. As a result, the supply of purge gas to the fuel oil injection nozzle is accelerated, and coking can be effectively suppressed.

(11) A gas turbine control program according to one aspect for controlling a gas turbine that includes: a combustor having a fuel oil injection nozzle for injecting fuel oil into a combustion chamber; a fuel oil supply system for supplying the fuel oil to the fuel oil injection nozzle; a purge gas supply system for supplying purge gas to the fuel oil injection nozzle; and a purge gas supply pressure adjustment part for adjusting supply pressure of the purge gas is capable of causing a computer device to execute: a step of acquiring an operating state of the gas turbine; a step of setting a supply pressure target value of the purge gas, based on the operating state; a step of obtaining a limited supply pressure target value by limiting an increase rate of the supply pressure target value to be less than or equal to an increase rate upper limit; a step of determining whether correction of the increase rate upper limit is necessary, based on the operating state; a step of correcting the increase rate upper limit so that the increase rate upper limit is increased if it is determined that the correction is necessary; and a step of controlling the purge gas supply pressure adjustment part so that the supply pressure of the purge gas becomes the limited supply pressure target value.

According to the above aspect (11), when it is determined, based on the operating state of the gas turbine, that there is a concern about insufficient supply of purge gas, for example, as the casing pressure of the gas turbine is greater than the purge gas supply pressure target value, the increase rate upper limit for limiting the increase rate of the supply pressure target value is corrected and increased. This shortens the period during which the casing pressure of the gas turbine is greater than the purge gas supply pressure target value due to the supply pressure target value being limited by the increase rate upper limit. As a result, the supply of purge gas to the fuel oil injection nozzle is accelerated, and coking can be effectively suppressed.

The invention claimed is:

1. A gas turbine control device for controlling a gas turbine, the gas turbine control device comprising:
    a processor; and
    a non-transitory computer-readable medium,
    wherein the gas turbine includes:
    a combustor having a fuel oil injection nozzle for injecting a fuel oil into a combustion chamber;
    a fuel oil supply system for supplying the fuel oil to the fuel oil injection nozzle;
    a purge gas supply system for supplying a purge gas to the fuel oil injection nozzle; and
    a purge gas supply pressure adjustment device for adjusting a supply pressure of the purge gas, and
    wherein the non-transitory computer-readable medium has stored thereon executable instructions that, when executed by the processor, cause the gas turbine control device to function as:
    an operating state acquisition part for acquiring an operating state of the gas turbine;
    a supply pressure target value setting part for setting a supply pressure target value of the purge gas, based on the operating state of the gas turbine;
    an increase rate limiting part for obtaining a limited supply pressure target value by limiting an increase rate of the supply pressure target value to be less than or equal to an increase rate upper limit;
    a determination part for determining that a correction of the increase rate upper limit is necessary if at least one of an increase rate of a casing pressure of the gas turbine, a decrease rate of a rotation speed of the gas turbine, an increase rate of a load of the gas turbine, or an increase rate of an opening degree of an inlet guide vane of the gas turbine is more than or equal to a respective reference value, based on the operating state of the gas turbine;
    an increase rate upper limit correction part configured to correct the increase rate upper limit to an infinitely large value if the determination part determines that the correction of the increase rate upper limit is necessary; and a control part for controlling the purge gas supply pressure adjustment device so that the supply pressure of the purge gas becomes the limited supply pressure target value.

2. The gas turbine control device according to claim 1, wherein the determination part is configured to determine that the correction of the increase rate upper limit is necessary if the increase rate of the casing pressure of the gas turbine is more than or equal to the respective reference value.

3. The gas turbine control device according to claim 1, wherein the determination part is configured to determine that the correction of the increase rate upper limit is necessary if the decrease rate of the rotation speed of the gas turbine is more than or equal to the respective reference value.

4. The gas turbine control device according to claim 1, wherein the determination part is configured to determine that the correction of the increase rate upper limit is necessary if the increase rate of the load of the gas turbine is more than or equal to the respective reference value.

5. The gas turbine control device according to claim 1, wherein the determination part is configured to determine that the correction of the increase rate upper limit is necessary if the increase rate of the opening degree of the inlet guide vane of the gas turbine is more than or equal to the respective reference value.

6. The gas turbine control device according to claim 1, wherein the supply pressure target value setting part is configured to set the supply pressure target value by adding a preset reference differential pressure to the casing pressure of the gas turbine.

7. The gas turbine control device according to claim 1, wherein the gas turbine further includes:
a fuel gas injection nozzle for injecting a fuel gas into the combustion chamber; and
a fuel gas supply system for supplying the fuel gas to the fuel gas injection nozzle.

8. The gas turbine control device according to claim 1, wherein the purge gas is compressed air.

9. A gas turbine control method for controlling a gas turbine, and the gas turbine including:
a combustor having a fuel oil injection nozzle for injecting a fuel oil into a combustion chamber;
a fuel oil supply system for supplying the fuel oil to the fuel oil injection nozzle;
a purge gas supply system for supplying a purge gas to the fuel oil injection nozzle; and
a purge gas supply pressure adjustment device for adjusting a supply pressure of the purge gas,
the gas turbine control method comprising:
acquiring an operating state of the gas turbine;
setting a supply pressure target value of the purge gas, based on the operating state of the gas turbine;
obtaining a limited supply pressure target value by limiting an increase rate of the supply pressure target value to be less than or equal to an increase rate upper limit;
determining whether at least one of an increase rate of a casing pressure of the gas turbine, a decrease rate of a rotation speed of the gas turbine, an increase rate of a load of the gas turbine, or an increase rate of an opening degree of an inlet guide vane of the gas turbine is more than or equal to a respective reference value, based on the operating state of the gas turbine;
determining that a correction of the increase rate upper limit is necessary if the at least one of the increase rate of the casing pressure of the gas turbine, the decrease rate of the rotation speed of the gas turbine, the increase rate of the load of the gas turbine, or the increase rate of the opening degree of the inlet guide vane of the gas turbine is more than or equal to the respective reference value, based on the operating state of the gas turbine;
correcting the increase rate upper limit to an infinitely large value if the correction of the increase rate upper limit is determined to be necessary; and
controlling the purge gas supply pressure adjustment device so that the supply pressure of the purge gas becomes the limited supply pressure target value.

10. A non-transitory computer-readable medium that stores a gas turbine control program for controlling a gas turbine, and the gas turbine including:
a combustor having a fuel oil injection nozzle for injecting a fuel oil into a combustion chamber;
a fuel oil supply system for supplying the fuel oil to the fuel oil injection nozzle;
a purge gas supply system for supplying a purge gas to the fuel oil injection nozzle; and
a purge gas supply pressure adjustment device for adjusting a supply pressure of the purge gas,
the gas turbine control program being capable of causing a computer to:
acquire an operating state of the gas turbine;
set a supply pressure target value of the purge gas, based on the operating state of the gas turbine;
obtain a limited supply pressure target value by limiting an increase rate of the supply pressure target value to be less than or equal to an increase rate upper limit;
determine that a correction of the increase rate upper limit is necessary if at least one of an increase rate of a casing pressure of the gas turbine, a decrease rate of a rotation speed of the gas turbine, an increase rate of a load of the gas turbine, or an increase rate of an opening degree of an inlet guide vane of the gas turbine is more than or equal to a respective reference value, based on the operating state of the gas turbine;
correct the increase rate upper limit to an infinitely large value if the correction of the increase rate upper limit is determined to be necessary; and
control the purge gas supply pressure adjustment device so that the supply pressure of the purge gas becomes the limited supply pressure target value.

* * * * *